(12) United States Patent
Beneviste

(10) Patent No.: US 7,978,637 B2
(45) Date of Patent: Jul. 12, 2011

(54) POWER-SAVING MECHANISMS FOR 802.11 CLIENTS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 511 days.

(21) Appl. No.: 10/926,501

(22) Filed: Aug. 26, 2004

(65) Prior Publication Data

US 2005/0047357 A1    Mar. 3, 2005

(51) Int. Cl.
*G08C 17/00*    (2006.01)

(52) U.S. Cl. ........ 370/311; 370/328; 370/338; 455/574; 455/41.2

(58) Field of Classification Search .......... 455/572–574, 455/343.4, 41.2; 370/311; 340/7.34
See application file for complete search history.

(56) References Cited

U.S. PATENT DOCUMENTS

| | | | | |
|---|---|---|---|---|
| 5,274,843 A | * | 12/1993 | Murai et al. ................. | 340/7.35 |
| 5,797,094 A | * | 8/1998 | Houde et al. ............... | 455/412.2 |
| 7,194,261 B2 | * | 3/2007 | Emeott et al. .............. | 455/426.2 |
| 7,245,946 B2 | * | 7/2007 | Liu ............................... | 455/574 |
| 7,508,781 B2 | * | 3/2009 | Liu et al. ....................... | 370/311 |
| 7,551,592 B2 | * | 6/2009 | van Kampen et al. ........ | 370/338 |
| 7,551,948 B2 | * | 6/2009 | Meier et al. .................... | 455/574 |
| 7,801,092 B2 | * | 9/2010 | Meier ............................. | 370/338 |
| 7,881,322 B1 | * | 2/2011 | Benveniste .................... | 370/414 |
| 2004/0224728 A1 | * | 11/2004 | Dacosta et al. ............... | 455/574 |
| 2005/0009578 A1 | * | 1/2005 | Liu ............................... | 455/574 |
| 2010/0284380 A1 | * | 11/2010 | Banerjee et al. .............. | 370/338 |

* cited by examiner

*Primary Examiner* — Sharad Rampuria
(74) *Attorney, Agent, or Firm* — Chapin IP Law, LLC; David W. Rouille, Esq.

(57) ABSTRACT

The station does not wake up for the beacon TIM if there is periodic uplink data with period less than or equal to the tolerance for downlink delay. If the station has no uplink data for at least a service interval (period of the stream), it wakes up to listen to the TIM. It continues to do so until either uplink or downlink data arrives. If the TIM indicates downlink data buffered, and if the station continues to have no uplink data, it starts waking tip at the service interval and sends null frames uplink, in order to signal that it is awake and ready to receive downlink data. If uplink data is generated, the station will send the uplink frame instead of the null frame.

10 Claims, 1 Drawing Sheet

POWER-SAVING MECHANISMS FOR 802.11 CLIENTS

FIELD OF THE INVENTION

The present invention relates to telecommunications in general, and, more particularly, to wireless local area networks.

BACKGROUND OF THE INVENTION

An 802.11 station can prolong its battery life by powering off its radio when not transmitting or receiving. The efficiency of the protocol determining when a station should wake up in order to send and/or receive transmissions destined to it will depend on the type of traffic involved. The traffic may be periodic in one or both directions, and have different priorities. The 802.11e draft standard provides two mechanisms for power-saving delivery: The Power Management mechanism in the 802.11-1999 standard, referred to here as the 'legacy' mechanism, and the APSD (Automatic Power Saving Delivery) mechanism. The latter is designed to improve QoS performance by taking advantage of the periodic nature of VoIP and other synchronous downlink streams. The legacy mechanism can also be used for VoIP calls, but less effectively. In this paper we describe how the two mechanisms would be used for bi-directional periodic streams. We also describe how traffic prioritization would be handled.

While operating under legacy power management, a station can have its downlink traffic buffered when it is asleep. The station requests buffering of its traffic by setting the power management bit "ON" in the frame control field of a frame transmitted uplink. When it wakes up, the station can receive its frames by indicating that it is awake. This can be done in two ways: one by setting the power management bit "OFF" in the flame control field of its frames uplink, and the other by sending a PS (power saving) poll to request the transmission of a single frame. When the former method is used, the AP can notify the station when the all buffered frames have been transmitted and the buffer is empty by setting the more data bit in the last frame transmitted to a station "OFF". If the station has no more uplink frames to send, it can go back to sleep after acknowledgement has been sent for the last buffered frame. If more frames are pending uplink transmission, the station can stay awake to transmit these frames, and will go to sleep, provided the acknowledgements received from the AP continue to indicate that there are no frames buffered. When the station goes back to sleep, it can turn the power management bit "ON" in the frame control field of either the ACK to the last downlink frame received, or in the frame control field of the last uplink frame sent. All retransmissions of frames lost or received with errors will occur during the time interval when the powersaving bit is "OFF".

The legacy power saving mechanism can be combined with new features of the 802.11 e draft standard to yield a more efficient power saving mechanism. Specifically, the new QoS frame format allows the AP to indicate whether a QoS frame is the last frame to be transmitted in the present wake-up period by setting the last bit in the QoS control field. This flag is different from the more data bit in the frame control field, used to signal that there are more frames buffered at the AP for the destination station. The capability to indicate both is useful when the AP must postpone certain downlink transmissions in order to meet QoS requirements. A station that goes to sleep having received a downlink frame with both the Last bit "ON" and the More Data bit "ON" may send a null frame with Power Management bit "OFF" to receive the remaining buffered frames at a later time.

A power-saving station can find out whether there is buffered traffic at the AP by reading the beacon TIM, which indicates so. If, however, a station has a reason to wake up and transmit uplink frequently (that is, at time interval shorter than the beacon period), there is no need to wake tip in order to listen to the beacon TIM. The more data bit in the acknowledgement lets the station know of its buffered frames pending transmission.

An example of this arises during a VoIP call. In general, a station capable of VoIP calling is typically in one of two modes: Stand-by or Active. In the stand-by mode it is powered on but does not engage in calling. A station in stand-by mode may receive or send signaling traffic during the initiation of a call. In the active mode the station is engaged in a call, or equivalently, generates and receives traffic periodically. A station exchanging traffic with the AP that is not symmetric can operate as in stand-by VoIP mode. A station sending periodic traffic streams uplink without receiving a periodic downlink stream can operate as in the VoIP active mode, provided that the delay tolerance for downlink frames is not less than the interarrival time of the periodic uplink stream. The 'legacy' power saving mechanism in 802.11-1999 can be used for both modes.

If silences are not suppressed during a VoIP call, there will be frames generated periodically along both directions, uplink and downlink. In that case, the station would wake up to transmit its uplink frames. Having been notified of the existence of buffered downlink frames by the more data bit in the acknowledgement frame, the station will stay awake to receive its buffered frames.

With silence suppression at the station, there are two possible modes of operation. The station may wake up periodically and transmit null frames. Acknowledgement of uplink frames would indicate whether downlink frames are pending transmission, and hence the station would stay awake to receive its buffered frames, as described above. Alternatively, the station may listen to the beacon TIM to ascertain the same. The advantage of the second method is that less power would be used if the downlink side were silent, too. If the downlink side is sending frames, it is preferable to just send null frame at the service period, as less power would be used. The station will have omitted powering on for the TIM. The best arrangement would be a combination of the two approaches.

SUMMARY OF THE INVENTION

The station does not wake up for the beacon TIM if there is periodic uplink data with period less than or equal to the tolerance for downlink delay. If the station has no uplink data for at least a service interval (period of the stream), it wakes up to listen to the TIM. It continues to do so until either uplink or downlink data arrives. If the TIM indicates downlink data buffered, and if the station continues to have no uplink data, it starts waking tip at the service interval and sends null frames uplink, in order to signal that it is awake and ready to receive downlink data. If uplink data is generated, the station will send the uplink frame instead of the null frame.

The logic of station operation under the Legacy power-saving rules is outlined below. It is assumed that the downlink service interval specified is shorter than the TIM beacon interval.

1. The station will go to sleep and wake up to listen to the beacon TIM periodically to check whether there is buffered traffic, unless there is periodic uplink traffic generated by the station with a shorter service interval than the TIM beacon interval.

a. If buffered traffic is indicated, the station will send a null frame with the Power Management bit "OFF" in the frame control field, signaling to the AP that it is awake.

b. If no buffered traffic is indicated in step 1, the station will repeat step 1 at the next beacon interval.

2. If uplink traffic is generated periodically with a shorter period than the TIM beacon interval, the station will wake up and send uplink frame(s) as they arrive.

3. An uplink frame with the Power Management bit "OFF" in the frame control field will signal the AP that the power-saving station is awake.

4. The station will stay awake until it has transmitted all its uplink frames and has received notice from the AP that either there are no buffered frames pending transmission, or downlink transmission of buffered frames is postponed. A downlink-frame with the More Data bit "OFF" in the frame control field, will signal that there are no more downlink frames pending transmission. A downlink frame with the Last bit "ON" in the QoS control field, signals that the AP will not transmit more downlink frames during this wake-up period.

5. Having received a downlink frame with either the More Data bit "OFF" or the Last bit "ON", a station shall indicate in its last frame that it is going back to sleep. The last frame will be either the last uplink MSDU or an ACK to the last downlink frame.

6. If the last uplink transmission is an uplink MSDU, the station will stay awake until the expiration of the NAV or until it receives an ACK, whichever occurs first. If an ACK is not received, it will retransmit the frame.

7. If the last frame is an ACK to a downlink frame, the station will stay awake until it receives another transmission starting at PIFS following ACK timeout. If no such transmission occurs the station can go to sleep. If the transmission is not directed to itself, the station can go to sleep. Otherwise the station will acknowledge receipt of the frame and stay awake until it receives another transmission starting at PIFS following ACK timeout.

8. A station that goes to sleep having received a downlink frame with the Last bit "ON" and the More Data bit "ON" may subsequently send a null frame with Power Management bit "OFF" to receive the remaining buffered frames.

The feature in step 7 is not specified in the draft standard. This feature is added by Avaya to safeguard against repeated retransmissions by the AP. It avoids unanswered retransmissions when the ACK to the last downlink frame is missed and the station has gone to sleep.

DETAILED DESCRIPTION

AP 'Legacy' Operation

Figure 1:
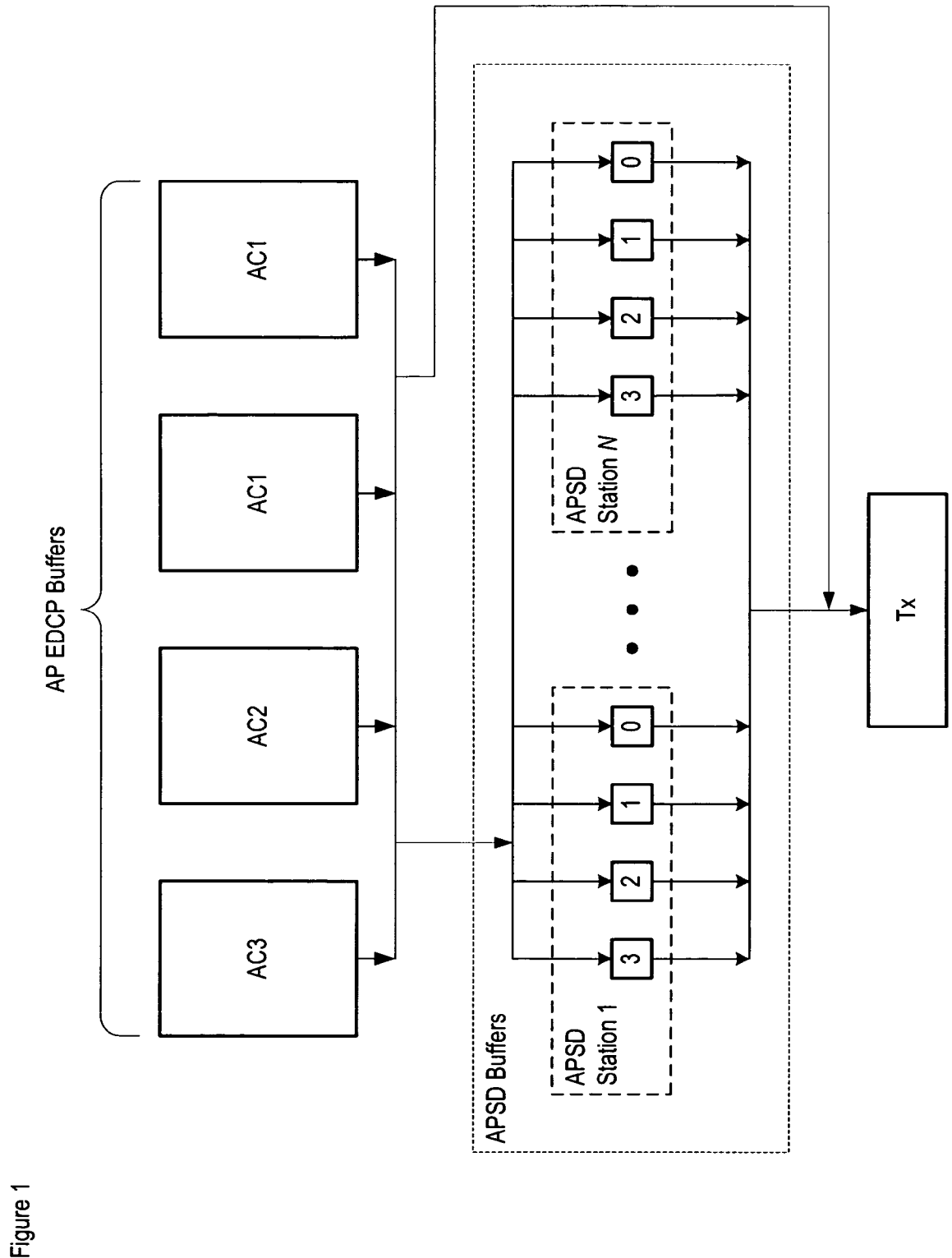
FIG. 1 illustrates processing of downlink frames at the AP.

1. The AP sends frames buffered for a power saving station as soon as the station wakes up. That is indicated when a frame is received from that station with the Power Management bit "OFF" in the frame control field. Downlink data is piggybacked with any pending ACKs to uplink data from the station. If there is no frame to send in a cycle, it sends nothing.

2. Receipt of a frame with the Power Management bit "ON" in the frame control field indicates that the station sending the frame is in sleep mode.

3. The AP buffers the frames destined to a station in power saving mode.

4. The More Data bit in the frame control field is "ON" for all buffered frames except the last, in which the same is set "OFF".

5. 111, Last bit 111 the QoS control field is "OFF" for all downlink frames sent to a station until the AP determines that other downlink transmissions have precedence, in which case the AP sends downlink frames with the Last bit "ON".

6. If the AP that receives an uplink frame from a station for which it has no buffered data, it will set the More Data bit "OFF" in the ACK sent to that station.

QoS Prioritization Under 'Legacy' Power Management

To meet QoS requirements, separate EDCF buffers are used to store frames by their priority at the station Buffers are emptied using the rules of EDCF contention. To preserve battery life, a station may wake up either when delay-sensitive traffic (high priority EDCF traffic) arrives at its buffer, or after the uplink frames have reached a specified age, at which point the station will transmit uplink frames with the same TXOP. The station will stay awake to receive the frames that are buffered at the AP. If all the frames are not sent by the AP while the station wakes up for transmission of uplink frames, the station will wake up subsequent to being notified that there are downlink frames remaining buffered at the AP in order to receive these frames. All priority queues at the station will contend while the station is awake. Channel contention for uplink transmission may be interrupted and the station may go to sleep in order to avoid a long contention period and heavy battery drain.

FIG. 1 illustrates processing of downlink frames at the AP. To meet QoS requirements, separate buffers are used to store frames by their priority at the AP; one such set of buffers for each power-saving station. The buffers are filled from the EDCF buffers as the backoff timer of downlink frames destined for stations in power saving mode expires. Since such frames cannot be transmitted immediately, they are buffered by their priority. Priority based buffering enables a station to receive its delay-sensitive frames first, and to postpone delivery of delay-insensitive frames of necessary.

At the AP, buffers are emptied when a frame arrives from the station, indicating that the station is awake. The AP will start transmitting the frames buffered for that station in the highest priority buffer first. The AP may access the channel if it has been idle for a time interval of duration PIFS Downlink transmission to a station that is awake may stop before the buffers are all empty if the AP has higher priority traffic pending for other stations. The last bit will be used to notify a station that no more downlink frames will be sent while it is still awake, and it may thus go sleep. A station that goes to sleep having received a downlink frame with the Last bit "ON" and the More Data bit "ON" may subsequently send a null frame with Power Management bit "OFF" to receive the remaining buffered frames.

The user priority of the uplink frame serving to notify the AP that the station is awake need not restrict the user priority of the buffered frame transmitted in response. In general, the higher-priority frames will be transmitted before lower priority frames, unless other algorithms are adopted at the AP to account in addition to priority, the age of the buffered frame and its remaining life.

VoIP Calling Using the APSD Mechanism

APSD (automatic power saving delivery) is designed for periodic downlink traffic streams. It applies to both symmetric and non-symmetric traffic streams. The legacy power-saving rules apply when operating under APSD. In addition, a station operating in APSD mode indicates in a TSPEC request the rate at which downlink frames will be generated. (The version of APSD discussed here is that described in IEEE doc. 802.11-03/107r2, which was voted into the 802.11e draft standard during the IEEE 802.11 TGe meeting held from May 11-16 th in Dallas, Tex.) The AP will schedule the time of downlink frame delivery to the station, notifying the station of this schedule in its TSPEC response. The station must wake up to receive downlink frames according to that schedule. It should be noted that APSD applies to non-symmetric periodic streams, such as audio and video.

APSD can be combined with legacy power saving in order to accommodate both periodic and non-periodic traffic. When the downlink traffic is not periodic, a station can use the legacy power management method described above. For instance, when in stand-by mode, a station would listen to the TIM beacon and send an uplink frame to receive all buffered frames. If the AP receives a frame with the Power Management bit "-OFF" in the frame control lent, the AP will send frames buffered for that station regardless of whether this occurs at the scheduled wake up time. A station would not need to wake up to find out from the TIM whether there are downlink frames waiting if there is an APSD downlink stream scheduled.

In general, a power-saving station can transmit uplink transmissions at any time. There are benefits derived, however, from coordinating uplink transmission with the APSD schedule. APSD can be used with both channel access mechanisms, distributed random access (as in EDCF) and centralized polled access (as in HCF polling). If a station with an admitted APSD TSPEC uses EDCF access, it is efficient to send uplink frames at the specified APSD schedule. Otherwise, a station would have to expend additional energy for powering up at a different time to transmit. When using polled access, the AP will send a poll combined with the downlink data; both will be transmitted according to the specified schedule. In addition to the power savings during power-up mentioned above, piggybacking a poll enables uplink transmissions to occur without contention. The APSD service interval should be short enough to accommodate all downlink APSD streams. A power-saving station will be polled with an aggregate schedule for all traffic streams.

To summarize,

1. A station will use the Legacy power saving mechanism unless there is a downlink APSD TSPEC request admitted for the station with a service interval shorter than the TIM beacon interval, in which case it employs APSD as described below.

2. If there is a downlink APSD TSPEC admitted for a station with a longer service interval than the TIM beacon interval, the station will engage in both the Legacy power saving-mechanism and APSD as described below. Null uplink frames with the Power Management bit "OFF" in the frame control field will be sent when the station wakes to receive buffered frames, provided that it is not due to wake up shortly according to the APSD schedule.

The operation of the station and the AP under APSD is described in more detail below for each of the two access modes.

Station APSD Operation
EDCF Access

1. The station wakes up periodically at the TSPEC-specified schedule and sends any buffered uplink frames.

2. If there is no frame to send in a cycle, the station waits to receive a downlink transmission. If a transmission is received but it is not directed to itself, the station will go to sleep. The station will stay awake for a specified time (e.g. SIFS plus the transmission time of two data frames and an ACK) and if no transmission is received, it goes to sleep.

3. The station will stay awake until it has transmitted all its uplink frames and has received notice from_the AP that there are no buffered frames pending immediate transmission. A downlink frame with the More Data bit "OFF" in the frame control field, signals that there are no more downlink frames pending transmission. A downlink frame with the Last bit "ON" in the QoS control field, signals that the AP need not transmit more downlink frames during this wake-up period.

4. Having received a downlink frame with either the More Data bit "OFF" or the Last bit "ON", a station shall acknowledge receipt of the frame and stay awake until it receives another transmission starting at PIFS following ACK timeout. If no such transmission occurs the station will go to sleep. If the transmission is not from the AP, or not directed to itself, the station will go to sleep. Otherwise the station will acknowledge receipt of the frame and stay awake until it receives another transmission starting at PITS following ACK timeout. (The feature in step 4 is not in the draft standard. It is intended to avoid unanswered retransmissions in the situation where the ACK to the last downlink frame is missed and the station has gone to sleep.)

5. A station that goes to sleep having received a downlink frame with the Last bit "ON" and the More Data bit "ON" may send a null frame with Power Management bit "OFF" to receive the remaining buffered frames.

Polled Access

1. The station wakes up periodically at the TSPEC-specified schedule and waits to be polled. Uplink data is piggybacked with ACKs.

2. After a specified time expires without receiving a poll, the station sends a frame uplink using EDCF access.

3. The station will stay awake until it has transmitted all its uplink frames and has received notice from the AP that there are no buffered frames pending immediate transmission. A downlink frame with the More Data bit "OFF" in the frame control field, signals that there are no more downlink frames pending transmission. A downlink frame with the Last bit "ON" in the QoS control field, signals that the AP need not transmit more downlink frames during this wake-up period.

4. Having received a downlink frame with either the More Data bit "OFF" or the Last bit "ON", a station shall acknowledge receipt of the frame and stay awake until it receives another transmission starting at PIFS following ACK timeout. If no such transmission occurs the station can go to sleep. If the transmission is not from the AP, or not directed to itself, the station can go to sleep. Otherwise the station will acknowledge receipt of the frame and stay awake until it receives another transmission starting at PIFS following ACK timeout.

5. A station that goes to sleep having received a downlink frame with the Last bit "ON" and the More Data bit "ON" may send a null frame with Power Management bit "OFF" to receive the remaining buffered frames.

AP APSD Operation EDCF Access—Active Mode

1. The AP sends any buffered frames at the TSPEC-specified schedule. Downlink data is piggybacked with any pending ACKs to uplink data from the station. If there is no frame to send in a cycle, it sends nothing.

2. Receipt of a frame with the Power Management bit "ON" in the frame control field indicates that the station sending the frame is going to sleep mode.

3. The AP buffers the frames destined to a station in power saving mode.

4. The More Data bit in the frame control field is "ON" for all buffered frames except the last, in which the same is set "OFF".

5. The Last bit in the QoS control field is "OFF" for all downlink frames sent to a station until the AP determines that other downlink transmissions have precedence, in which case the AP sends downlink frames with the Last bit "ON". Once a frame has been sent to a station with the Last bit "ON", the AP may send additional frames to the same station, provided the station remains awake.

6. If the AP that receives an uplink frame from a station for which it has no buffered data, it will set the More Data bit "OFF" in the ACK sent to that station.

Polled Access—Active Mode

1. The AP polls station starting at the TSPEC-specified schedule. Downlink data is piggybacked with polls to the station and ACKs to uplink data. Polling continues as indicated by the More Data bit (or the queue size) in the poll response 2. Receipt of a frame with the Power Management bit "ON" in the frame control field indicates that the station sending the frame is going to sleep mode.

3. The AP buffers the frames destined to a station in power saving mode.

4. The More Data bit in the frame control field is "ON" for all buffered frames except the last, in which the same is set "OFF".

5. The Last bit in the QoS control field is "OFF" for all downlink frames sent to a station until the AP determines that other downlink transmissions have precedence, in which case the AP sends downlink frames with the Last bit "ON". Once a frame has been sent to a station with the Last bit "ON", the AP may send additional frames to the same station, provided the station remains awake.

6. If the AP has no buffered data, it will set the More Data bit "OFF" in the poll sent to that station.

QoS Prioritization Under APSD

As in the case of Legacy power saving, QoS requirements are best served when the AP is free to send downlink frames as soon as possible, or according to the criteria employed in a scheduling algorithm. In general, the higher-priority frames will be transmitted before lower priority frames, unless other algorithms are adopted at the AP to account, in addition to priority, the age of the buffered frame and its remaining life. That means that downlink transmission of frames buffered at the AP should be allowed to occur when the station wakes up, regardless of what causes the station to wake up. That is, regardless of whether the station follows the APSD schedule, or sends uplink frames with the Power Management bit "OFF" in the frame control field according to the legacy power-saving method.

All TSPEC requests from stations employing APSD will use the same service interval. If access is achieved by polling, the AP should supply an aggregate polling schedule.

Buffers at the AP are emptied when the station is off the power saving mode. Using the PIFS access rule (the AP accesses the channel if it has been idle for a time interval of duration PIFS), the higher priority queues are typically emptied first, followed by the lower priority. Downlink transmission to a station that is awake may stop before the buffers are all empty if the AP has higher priority traffic pending for other stations. The last bit will be used to notify a station that no more downlink frames will be sent while it is still awake, and it may thus go sleep. A station that goes to sleep having received a downlink frame with the Last bit "ON" and the More Data bit "ON" may subsequently send a null frame with Power Management bit "OFF" using EDCF access in order to receive the remaining buffered frames.

Comparison of 'Legacy' and APSD

Advance knowledge of the station wake-up schedule in APSD enables the station to wake up when the AP is ready to transmit downlink frames. It is not necessary to be prompted by the station with uplink frames notifying that it is awake. Hence, APSD is efficient for both symmetric (e.g. voice) and asymmetric (e.g. video) periodic streams. APSD, when used with either EDCF or polled access, increases channel utilization efficiency because the station need not stay awake waiting for the AP to complete other transmissions andnTXOPs before sending buffered data to the power-saving station. Doing otherwise would cause battery drain, delay and jitter. HCF polling combined with APSD gives even better results in tern-is of battery life. Piggybacking data with a poll or an acknowledgement reduces channel overhead. Polling further eliminates power consumption as the station avoids contention for the channel to send its uplink frame.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

I claim:

1. A method comprising:
receiving, at a station, a downlink frame from an Access Point (AP), said downlink frame indicating that no more frames will be sent from said AP to said station;
indicating, by said station, that said station is going into power-save mode upon receipt of said downlink frame indicating that no more frames will be sent from said AP;
said station remaining active while said station waits to receive another transmission intended for said station from said AP within a predetermined time period; and
wherein said station enters power-save mode when said another transmission is not received at said station and wherein said station remains active when said another transmission is received by said station;
wherein said predetermined time period comprises a Point coordination function Inter-Frame Space (PIFS) following an acknowledgement.

2. The method of claim 1 further comprising sending an acknowledgement (ACK) upon receipt of said another transmission.

3. The method of claim 2 further comprising remaining active until an additional transmission is received within said predetermined time frame.

4. The method of claim 1 wherein a downlink service interval is less than a Traffic Indication Map (TIM) beacon interval.

5. The method of claim 1 wherein said indicating, by said station, that said station is going into power-save mode comprises sending an acknowledgement to said AP.

6. A computer system comprising:
   a memory;
   a processor;
   a communications interface;
   an interconnection mechanism coupling the memory, the processor and the communications interface; and
   wherein the memory is encoded with an application that when performed on the processor, provides a process for processing information, the process causing the computer system to perform the operations of:
   receiving, at a station, a downlink frame from an Access Point (AP), said downlink frame indicating that no more frames will be sent from said AP to said station;
   indicating, by said station, that said station is going into power-save mode upon receipt of said downlink frame indicating that no more frames will be sent from said AP;
   said station remaining active while said station waits to receive another transmission intended for said station from said AP within a predetermined time period; and
   wherein said station enters power-save mode when said another transmission is not received at said station and wherein said station remains active when said another transmission is received by said station;
   wherein said predetermined time period comprises a Point coordination function Inter-Frame Space (PIFS) following an acknowledgement.

7. The computer system of claim 6 further comprising sending an acknowledgement (ACK) upon receipt of said another transmission.

8. The computer system of claim 7 further comprising remaining active until an additional transmission is received within said predetermined time frame.

9. The computer system of claim 6 wherein a downlink service interval is less than a Traffic Indication Map (TIM) beacon interval.

10. The computer system of claim 6 wherein said indicating, by said station, that said station is going into power-save mode comprises sending an acknowledgement to said AP.

* * * * *